United States Patent [19]

Kuroishi et al.

[11] E Re. 30,535

[45] Reissued Mar. 3, 1981

[54] DEVELOPING DEVICE IN ELECTROPHOTOGRAPHIC COPYING APPARATUS

[75] Inventors: Shoji Kuroishi; Manabu Mochizuki, both of Yokohama, Japan

[73] Assignee: Ricoh Co., Ltd., Tokyo, Japan

[21] Appl. No.: 35,897

[22] Filed: May 3, 1979

Related U.S. Patent Documents

Reissue of:

[64] Patent No.: 4,021,111
Issued: May 3, 1977
Appl. No.: 584,294
Filed: Jun. 6, 1975

[30] Foreign Application Priority Data

Jun. 10, 1974 [JP] Japan ..... 49-65721

[51] Int. Cl.[3] ..... G03G 15/10
[52] U.S. Cl. ..... 355/10; 118/648
[58] Field of Search ..... 355/10; 118/647, 648, 118/662, DIG. 23; 430/117-119

[56] References Cited

U.S. PATENT DOCUMENTS

| | | | |
|---|---|---|---|
| 3,707,943 | 1/1973 | Matsumoto et al. | 355/10 |
| 3,778,148 | 12/1973 | Fujitsuka et al. | 355/15 |
| 3,892,481 | 7/1975 | Schaefer et al. | 355/10 |

*Primary Examiner*—R. L. Moses
*Attorney, Agent, or Firm*—Gerard F. Dunne; Guy W. Shoup

[57] ABSTRACT

An improved developing device in electrophotographic copying apparatus in which a plurality of developing electrodes are disposed along a path of movement of a photosensitive drum surface. The electrodes are applied with voltages in a graded manner which conforms to the damping characteristic of the potential on the photosensitive surface at a developing station. The values of voltages applied can be controlled in accordance with the value of potential formed by an imaging area of the drum surface while maintaining the graded potential to thereby achieve an excellent developing effect. Further, the drum surface is provided with an unexposed and hence high potential portion which serves to remove toner which accumulates on the electrodes.

14 Claims, 8 Drawing Figures

DEVELOPING DEVICE IN ELECTROPHOTOGRAPHIC COPYING APPARATUS

Matter enclosed in heavy brackets [ ] appears in the original patent but forms no part of this reissue specification; matter printed in italics indicates the additions made by reissue.

BACKGROUND OF THE INVENTION

The invention relates to an improved developing device in electrophotographic copying apparatus.

In a wet developing process, a developing solution is supplied across a photosensitive member to develop an electrostatic latent image thereon. It is known to dispose a developing electrode within the developing solution in opposing relationship with the photosensitive member and to apply a bias voltage to the developing electrode in accordance with a residual potential on the photosensitive member, thereby preventing a background smearing. However, in the known process, the bias voltage applied to the developing electrode is, by several tens of volts, higher than the residual potential on the photosensitive member, so that an adhesion of toner to the electrode may occur, thereby reducing the intended electrode effect.

SUMMARY OF THE INVENTION

It is an object of the invention to provide an improved developing device in electrophotographic copying apparatus which permits the abovementioned disadvantage, namely, the adhesion of toner to the developing electrode, to be eliminated.

DETAILED DESCRIPTION OF THE PREFERRED EMBODIMENTS

Figure 1:
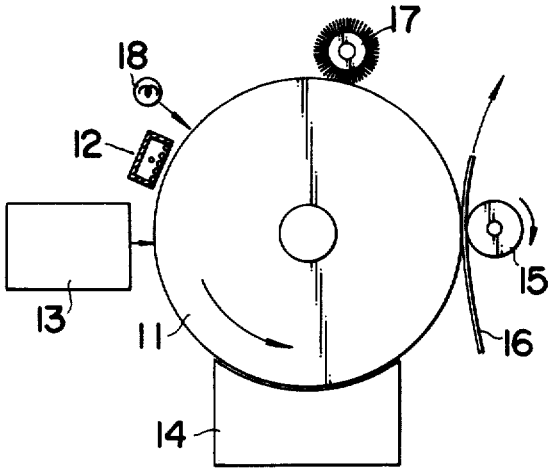
FIG. 1 is schematic view of an electrophotographic copying machine to which the invention is applied.

Referring to FIG. 1, there is shown a photosensitive member 11 which may be in the form of a drum arranged for rotation in the direction indicated by an arrow at a uniform speed by means of a suitable driving device. As the photosensitive member 11 rotates a sequential operation is effected. Specifically, the member 11 is charged by a charger 12, and then exposed to an image of an original to be copied which is formed by an exposure unit 13, thereby forming an electrostatic latent image thereon. Subsequently, the latent image is developed by a developing unit 14, and the developed image is transferred onto a transfer paper 16 at a transfer unit 15. Thereafter, the photosensitive member 11 is cleaned by a cleaning unit 17 and discharged by irradiation from a light source 18. The transfer sheet 16 which has an image transferred at the transfer unit 15 is fixed in a fixing unit (not shown) to be subsequently discharged as a copy.

Figure 2:
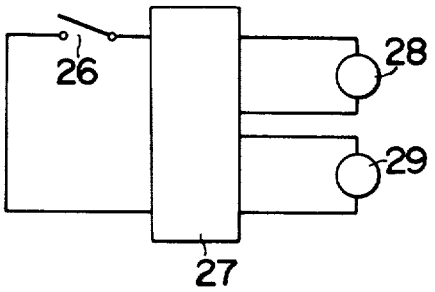
FIG. 2 is a circuit diagram of an electrical circuit used in the arrangement of FIG. 1.
Figure 4:
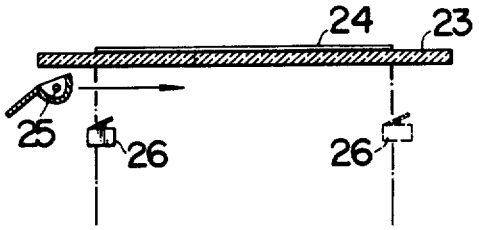
FIG. 4 is a fragmentary view of FIG. 3.
Figure 3:
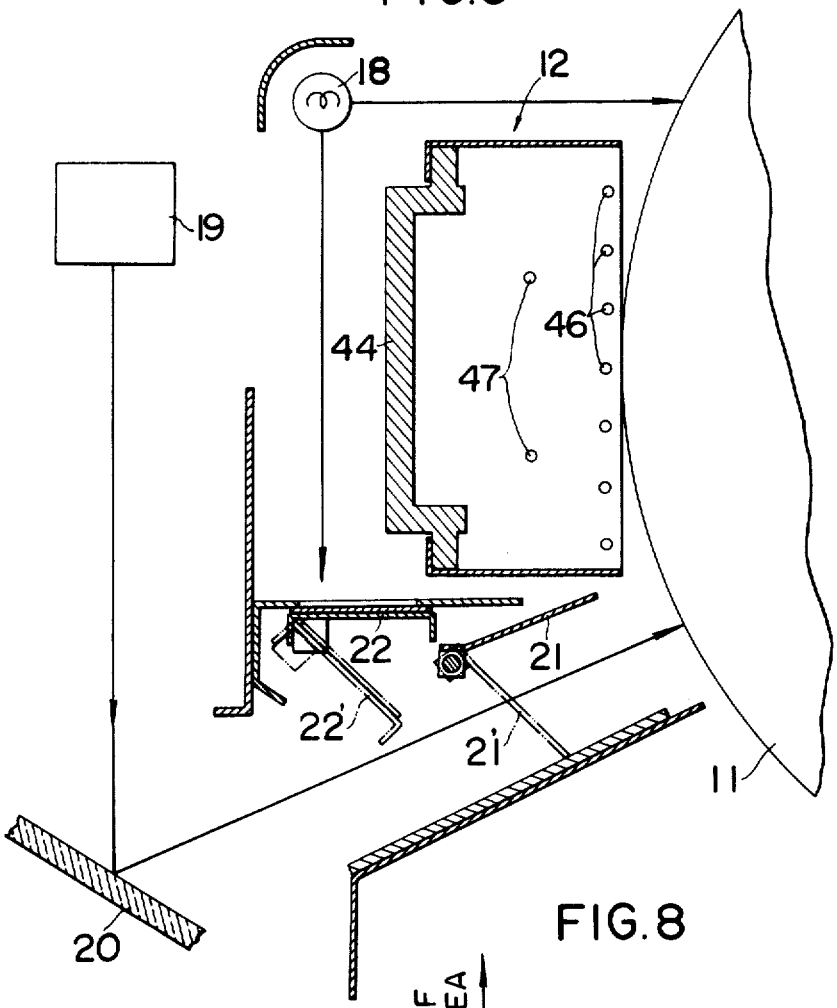
FIG. 3 is a schematic view of a portion of the machine shown in FIG. 1 which includes an exposure unit.
Figure 7:
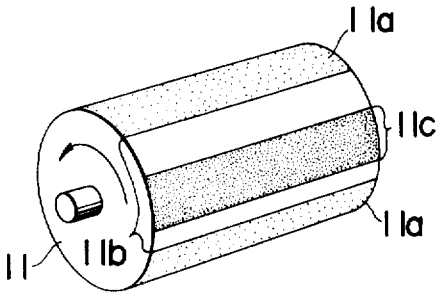
FIG. 7 is a perspective view of a photosensitive member used in the arrangement of FIG. 1, illustrating the potential distribution thereon.

Describing the copying process more specifically, subsequent to the flash charging of the photosensitive member 11 by the charger 12, a non-imaging area 11b, except at an imaging area 11a which is exposed to an image of the original through the exposure unit 13, includes a non-exposed area 11c which is unexpected and hence charged to a high potential, as shown in FIG. 7. Referring to FIG. 3, the exposure unit 13 includes a main body 19 which scans an original in synchronism with the photosensitive member 11 and exposes the photosensitive member 11 through a reflecting mirror 20 and an open shutter 21 which is pivotally mounted at its one end. Light from the light source 18 is projected onto the photosensitive member 11 through a movable reflecting mirror 22 which is also pivotally mounted at its one end, thereby discharging the electric charge on the photosensitive member 11. As indicated in FIG. 4, the main body 19 includes an original receptacle 23 adapted to place an original 24 thereon, which is illuminated by light from a light source 25, and reflected light therefrom is directed toward the reflecting mirror 20 through other reflecting mirrors. The original 24 is scanned by driving the light source 25, in the direction indicated by an arrow, in synchronism with the movement of the photosensitive member 11. A switch 26 is disposed below the receptacle 23 at a position corresponding to the initial or terminal end of the original 24, and the switch is operated by a portion of a light shield member (not shown) which is integral with the light source 25. As shown in FIG. 2, a control circuit 27 responds to the signal from the switch 26 by energizing a pair of electromagnets 28, 29 at a proper timing, thereby operating the shutter 21 and the movable reflecting mirror 22. The shutter 21 is opened as the main body 19 scans the original 24 from its initial to its terminal end, thereby projecting the image of the original 24 onto the imaging area 11a of the photosensitive member 11. The movable reflecting mirror 22 is opened at a proper timing except when the image of the original 24 is focussed onto the imaging area 11a. This occurs, during the time when the shutter remains closed as shown in phantom lines 21', whereby the light from the light source 18 is projected onto portion of the photosensitive member except the high potential portion 11c of the non-imaging area 11b for the purpose of discharge. During the time the image of the original 24 is projected onto the imaging area 11a, the light directed from the light source 18 is blocked from projection onto the imaging area 11a by means of the closed mirror 22'.

Figure 5:
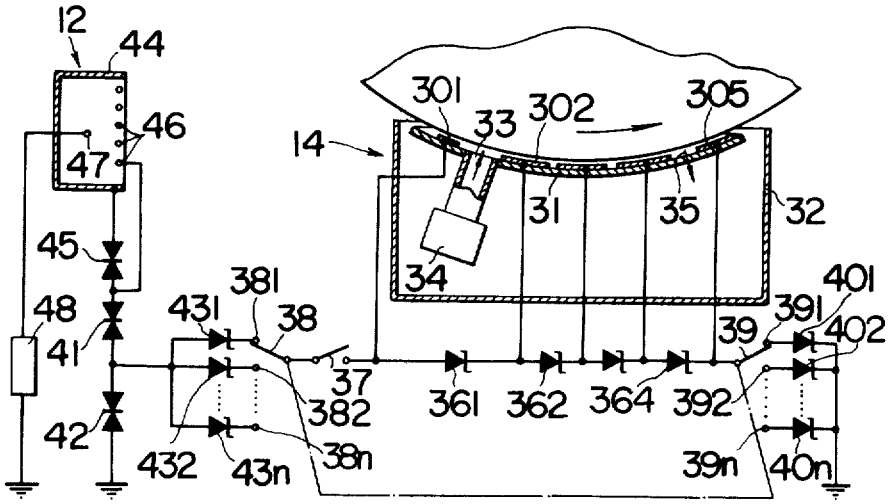
FIG. 5 is a schematic view of a portion of the arrangement shown in FIG. 1 which includes a developing unit.

Referring to FIG. 5, the developing unit 14 includes a plurality of developing electrodes 301 to 305 which are supported by an insulating plate 31 in opposing relationship with the photosensitive member 11. The unit 14 also includes a vessel 32 for containing a supply of developing solution, which is supplied by a pump 34 through an inlet 33 into the space between the photosensitive member 11 and the insulating plate 31. The solution is returned to the vessel 32 through a drain port 35. A plurality of constant voltage diodes 361 to 364 are connected between adjacent pair of electrodes 301 to 305, and the junction between the electrode 301 and the constant voltage diode 361 is connected through a switch 37 with the movable arm of a switch 38. The junction between the electrode 305 and the diode 364 is connected with the movable arm of a switch 39 which has a plurality of stationary contacts 391 to 39n, which are in turn connected with one terminal of a plurality of constant voltage diodes 401 to 40n, the other terminal of which is connected with the ground. A plurality of constant voltage diodes 431 to 43n are connected between the respective stationary contacts 381 to 38n of the switch 38 and a point of a given potential, which is shown as the junction between a pair of bidirectional varistors 41 and 42. The bidirectional varistors 41, 42 are connected in series with another bidirectional varistor 45 across a shield member 44 of the charger and the ground, and the junction between the bidirectional varistors 41, 45 is connected with a grid 46 of the charger 12 which has its corona wire 47 connected with a d.c. source 48. As indicated in FIG. 3, the corona wire 47 is disposed within the shield member 44 so as to be opposite to the photosensitive member 11 through the interposition of the grid 46, thereby charging the member 11 by means of corona discharge. A discharge will also occur between the corona wire 47 on one hand and the shield member 44 and the grid 46 on the other, thereby causing a current flow through the bidirectional varistors 41, 42 and 45, thus establishing a given potential on each of the shield member 44 and the grid 46. A voltage of given magnitude developed across the varistor 42 is supplied to the developing electrodes 301 to 305 through one of the diodes 431 to 43n and through one of the diodes 401 to 40n which are selected by the respective switches 38 and 39. It will be appreciated that the diodes 361 to 364 function to apply differential voltages to the respective electrodes 301 to 305 in a graded manner which corresponds to the damping characteristic of the residual potential on the photosensitive member 11.

Figure 8:
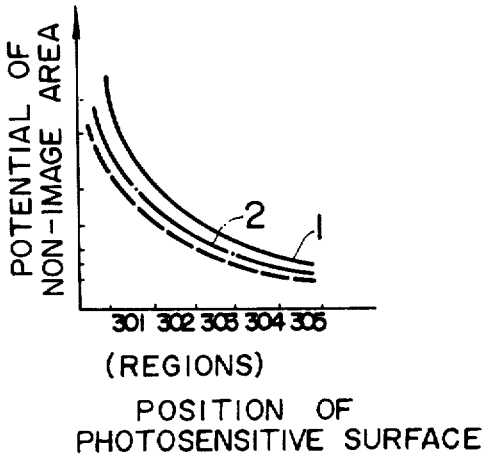
FIG. 8 graphically shows the damping characteristic of the potential of non-image areas on the photosensitive member in the region of the developing unit shown in FIG. 5.

FIG. 8 shows a family of curves representing the damping characteristic of the potential of the non-image area of the photosensitive member 11 which is exposed to the white portion of the original. The switches 38 and 39 are ganged. The diodes 401 to 40n have a descending order of voltage drop while the diodes 431 to 43n have an ascending order of voltage drop. Assume now that the movable arms of the switches 38 and 39 are connected with the stationary contacts 381 and 391, respectively, so that the voltage distribution and gradient of the electrodes 301 to 305 conform to a curve 1. Under this condition, when the movable arms of the switches 38 and 39 are thrown to the adjacent contacts 382 and 392, the potential applied to the respective electrodes 301 to 305 will be shifted to the voltage distribution conforming to a damping curve 2 of FIG. 8 which is spaced by $\Delta E$ from the initial damping curve 1, without changing the overall profile, since the diode 402 has a voltage drop which is by $\Delta E$ reduced from that of the diode 401 and the diode 432 has a voltage drop which is by $\Delta E$ increased over that of the diode 431. As a consequence, by manually operating the switches 38 and 39 in accordance with the level of the residual potential on the photosensitive member 11, it is possible to apply an optimum bias potential to the developing electrodes 301 to 305. An image area of the photosensitive member 11 which is charged to a higher potential than the bias potential will be developed by attraction of toner thereto while a non-image area will not be developed because the tone will be attracted toward the developing electrodes 301 to 305. This prevents an adhesion of the toner to an area of the photosensitive member 11 which corresponds to the white background of the original, thus avoiding a background smearing. The toner which is attracted to the developing electrodes 301 to 305 will be attracted to the high potential area portion 11c of the photosensitive member 11, whereby the developing electrodes 301 to 305 are cleaned.

Figure 6:
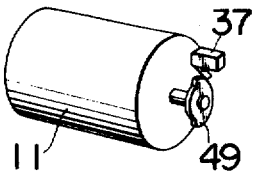
FIG. 6 is a perspective view of a cam and a switch which are used in the arrangement of FIG. 1.

As shown in FIG. 6, the switch 37 is driven at a given timing by means of a cam 49 which is coupled with the shaft associated with the photosensitive member 11. Specifically, the d.c. source 48 of the charger 12 is turned on before the leading edge of the imaging area 11a enters the coverage of the charger 12, and the switch 37 is turned on before the imaging area 11a comes opposite to the electrode 301. The source 48 is turned off after the high potential portion 11c has passed the charger 12, but at this time, such portion 11c moves opposite to the electrode 301, and the switch 37 is subsequently turned off. After the source 48 is turned off, the electrodes 301 to 305 are supplied with a bias potential by the electrostatic induction from the high potential portion 11c.

With the invention described above, a graded distribution of the bias potentials applied to the respective electrodes can be achieved in a manner corresponding to the potential damping characteristic of the photosensitive member, and the level of the bias potentials can be changed, thus permitting the bias potentials to be applied to the respective electrodes in accordance with the pattern of the non-image area so as to prevent a background smearing or the excessive attraction of toner to the electrodes, thus achieving an excellent electrode effect. By providing a high potential portion in the non-imaging area of the photosensitive member, the electrodes are cleaned by such high potential area, further contributing to the electrode effect.

What is claimed is:

1. In an electrophotographic copying apparatus comprising a movable member having a photosensitive surface and adapted to be moved along a predetermined path during which said surface is subject to charging, exposing to an image of an original to be copied to form an electrostatic latent image of the original thereon, developing of the latent image with a developing agent having toner, transfer printing of the developed image onto copy sheets, and cleaning of residual toner thereon, the improvement comprising:

a. a plurality of developing electrodes disposed along the path of movement of said surface in opposing relation thereto at a developing station, b. means for supplying the developing agent between said electrodes and said surface, c. voltage source means for providing a constant voltage [source for] *to* said electrodes, d. means for distributing the supplied voltage from said source means to said respective electrodes in a graded manner which substantially conforms to that of a reference damping characteristic of potential on said surface along the path of movement thereof at the developing station, and e. means for [varying the values] *changing the level* of [voltages] *voltage* applied to said respective electrodes without influence to said graded manner therebetween [in accordance with the value of potential of an electrostatic latent image on said surface to be developed].

2. An improvement as in claim 1 wherein said voltage source means comprises a portion of a charger for said charging which normally presents a constant voltage.

3. An improvement as in claim 1 wherein said distributing means comprises constant voltage diodes connected in series to each other and between said constant voltage source and ground and having junctions therebetween connected to said respective electrodes.

4. An improvement as in claim 3 wherein said varying means comprises a pair of variable voltage dropping means each connected between the series of said diodes and said control voltage source and said ground respectively.

5. An improvement as in claim 1 further comprising means for setting a portion to be unexposed on said photosensitive surface to maintain the unexpected portion at a high potential, whereby removing toner placed on said electrodes therefrom by the attraction of the high potential portion.

6. An electrophotographic copying apparatus comprising a movable member having a photosensitive surface, an electrostatic charger adjacent said member and located along the path of motion of said member, for imparting an electrostatic charge to said surface, an exposure unit adjacent said member and spaced away from said charger in the direction of motion of said member, having means to impart an electrostatic image to said surface, developer means adjacent said member and spaced away from said exposure unit in the direction of motion of said member, said developer means having a reservoir containing a developing agent which is attractable to said electrostatic image and forms a visual image corresponding to said electrostatic image on said surface, means for moving a copy sheet into pressing engagement with said member spaced away from said developer means in the direction of motion of said member, cleaning means adjacent said member and spaced away from said moving means in the direction of motion of said member, for cleaning away the developing agent from said surface, and a constant light source adjacent said member and spaced away from said cleaning means in the direction of motion of said member, for discharging said electrostatic charge by exposing said surface to light, said developer means comprising a plurality of electrodes spaced away from and facing said surface and disposed along the path of said surface, voltage source means connected to said electrodes for providing a constant voltage to said electrodes, pump means within said reservoir for supplying developing agent from said reservoir to the space between said electrodes and said surface, grading means connected to said electrodes for distribution the supplied voltage from said source means to said electrodes in a manner substantially conforming to the damping characteristic of the said electrostatic charge on said surface as said surface passes said electrodes, and [varying] *changing* means connected between said voltage source means and said grading means to change the *level of constant* voltage applied to said electrodes [in accordance with the value of said electrostatic image,] without influencing the graded relationship between said electrodes.

7. A copying apparatus according to claim 6, wherein said voltage source means comprises a portion of said charger having a constant voltage.

8. A copying apparatus according to claim 6, wherein said grading means comprises a plurality of constant voltage diodes connected in series to each other and having junctions therebetween connected to said electrodes.

9. A copying apparatus according to claim 8, wherein said varying means comprises a plurality of pairs of voltage dropping means connectable on one side to each end of said diode series, one pair at a time, and on the other side to said voltage source and ground respectively.

10. A copying apparatus according to claim 6, wherein said photosensitive surface has a portion charged by said charger and unexposed to light, thus forming a high potential area situated on said surface behind said electrostatic image, switching means connected to said electrodes and to said moving member to cut the voltage supply from said voltage source means to said electrodes at the time when said high potential area passes said electrodes, the difference in potential causing any excess developing agent left on said electrodes after said visual image forming to be electrostatically attracted to said high potential area.

11. An electrophotographic copying apparatus comprising a movable member having a photosensitive surface, means along the path of motion of said member for imparting an electrostatic image to said surface, developer means along the path of motion of said member and spaced from said former means in the direction of motion of said member, said developer means having a plurality of electrodes spaced from and facing said surface and disposed along said surface in the direction of motion of said member, a constant voltage source connected to said electrodes, a reservoir disposed below said electrodes containing a developing agent which is attractable to said electrostatic image and which forms a visual image corresponding with said electrostatic image, a pump in said reservoir for pumping said developing agent to the space between siad electrodes and said surface, grading means connected between said electrodes and said constant voltage source, for supplying voltages to said electrodes in a manner corresponding to the damage characteristic of said electrostatic image, said grading means having a plurality of constant voltage diodes equal to the number of electrodes, connected in series, said electrodes being connected individually between said diodes, at least one first multiposition switch being connected to one end of said series, and at least one second multi-position switch being connected to the other end of said series, said first and second multi-position switches being mechanically connected to each other and simultaneously operable, a first plurality of diodes, individually engageable with said first multiposition switch at one end and connected to a common point at the other end, a second plurality of diodes being individually engageable with said second multiposition switch at one end and connected to a common ground at the other end, said common point being connected to said constant voltage source, said multi-purpose switches being positionable to select a pair of diodes, one from said first plurality and one from said second plurality, to vary the potential applied to said diode series.

12. An electrophotographic copying apparatus, for making copies from the light image, comprising a moving member having a photosensitive surface, a charger adjacent said member and on the path of motion of said member for imparting an electrostatic charge to said surface, an exposure unit adjacent said member and spaced from said charger in the direction of motion of said member, for imparting an electrostatic image to said surface corresponding to said light image, a constant light source spaced from said surface in said exposure unit, shutter means in said exposure unit for selectively exposing said surface to light from said constant light source as said member moves past said exposure unit, developer means adjacent said member and spaced from said exposure unit in the direction of motion of said member, a plurality of electrodes in said developer means spaced from and facing said surface and disposed along said surface in the direction of motion of said member, a developing agent in said developer means attractable to said electrostatic image, and suppliable to the space between said electrodes and said surface, a portion of said surface being unexposed to light by said shutter means and retaining said charge imparted by said charger, said unexposed portion of said surface being formed on said surface at a location adjacent to and behind said electrostatic image, and passing said developer means after said electrostatic image and effective to attract excess developing agent from said electrodes.

13. An apparatus according to claim 12, wherein said exposure unit comprises said constant light source spaced from said movable member, said shutter means disposed between said member and said light source, and a scanner unit spaced from said member for supplying said light image, said shutter means disposed between said scanner and said member.

14. An apparatus according to claim 13, wherein said shutter means comprises a first mirror affixed to said exposure unit and facing said scanner unit at an angle to said scanner unit so as to reflect said light image into said surface, a door, pivotally mounted in said exposure unit between said first mirror and said surface, said door having an open position allowing said light image to be projected onto on said surface, and a closed position to block said light image, a second mirror pivotally mounted in said exposure unit between said constant light source and said surface, said second mirror having an open position which allows light from said constant light source to be reflected onto said surface by said second mirror, and a closed position which blocks said constant light source, said door and said second mirror being in respective closed positions to form said unexposed surface portion.

* * * * *